Figure 1:
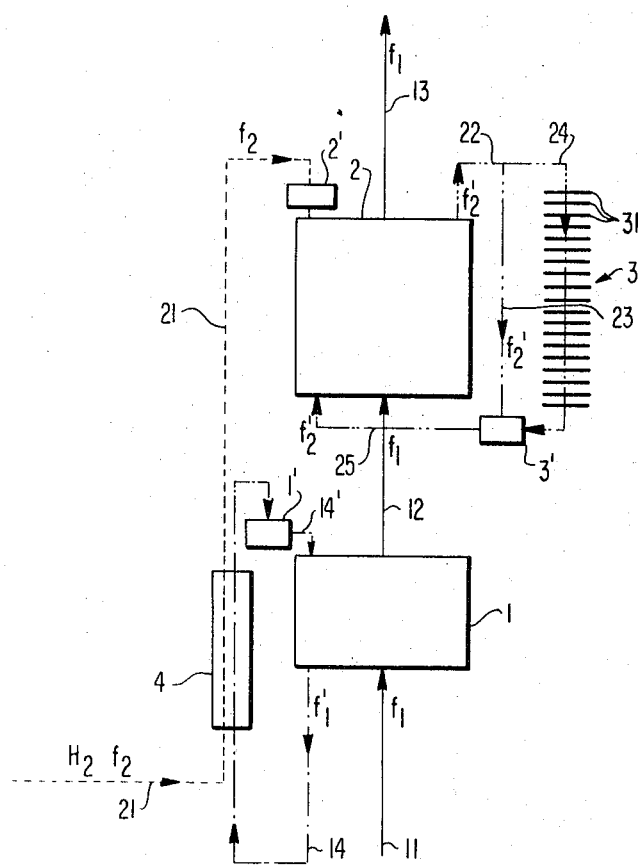

United States Patent [19]
Cheron

[11] 3,855,001
[45] Dec. 17, 1974

[54] FUEL CELL WITH AIR PURIFIER
[75] Inventor: Jacques Cheron, Versailles, France
[73] Assignee: Institut Francois du Petrole des Carburants et Lubrifiants, Rueil-Malmaison (Hauts-de-Seine), France
[22] Filed: Apr. 18, 1973
[21] Appl. No.: 352,350

Related U.S. Application Data
[63] Continuation-in-part of Ser. No. 125,208, March 17, 1971, abandoned.

[30] Foreign Application Priority Data
Mar. 26, 1970 France .............................. 70.11082

[52] U.S. Cl. .............................................. 136/86 C
[51] Int. Cl. .......................................... H01m 27/14
[58] Field of Search ...................... 136/86, 125, 208

[56] References Cited
UNITED STATES PATENTS
3,473,963  10/1969  Sanderson ........................ 136/86 B
3,507,702  4/1970  Sanderson ........................ 136/86 B
3,632,449  1/1972  Yardney .......................... 136/86 A Primary Examiner—A. B. Curtis
Attorney, Agent, or Firm—Craig & Antonelli

[57] ABSTRACT

A fuel cell comprising a cell block, fed with a comburent, a fuel and an electrolyte, and a comburent purifier, wherein the cell block forms a hot part of the fuel cell and is placed above the comburent purifier which forms the cold part of the fuel cell, said hot part and said cold part are connected to each other through a duct for the conveyance of the purified comburent to the cell block by natural convection and static suction means are provided for the exhaust of the comburent and the hot combustion products from the cell block.

11 Claims, 2 Drawing Figures

FUEL CELL WITH AIR PURIFIER

This is a continuation-in-part application of Ser. No. 125,208 filed Mar. 17, 1971, now abandoned.

The present invention relates to a fuel cell from which no electrical energy is taken to actuate auxiliary members or apparatus having rotating or linear movements, etc., such as pumps, blowers, suction fans, and the like.

In the known fuel cells, air blowers, circulating pumps and controlled regulating devices are used to control and circulate the fuel, comburent and electrolyte. All of these auxiliary members are actuated generally by electric motors, and the electric power or energy necessary for the operation thereof is supplied by the fuel cell which results in a decrease in the net output of the fuel cell, a more complicated construction thereof, and hence a decrease in the reliability of the fuel cell (battery), while increasing the frequency, the extent, and the cost of the maintenance thereof.

It is an object of the present invention to eliminate these disadvantages and drawbacks by providing a fuel cell in which none of the auxiliary apparatus that are used is actuated by electric energy taken from that generated by the fuel cell itself. This object is obtained according to the present invention by a vertical arrangement of the apparatus constituting the fuel cell in a manner such that the direction of movement of the comburent (i.e., combustion sustaining agent, e.g., air or oxygen) be upward. That is, the fuel cell block is placed above and substantially perpendicularly relative to the comburent purifier, i.e., straight above the comburent purifier. In addition, the thermal equilibrium of the fuel cell (battery) is assured by using a heat exchanger in the electrolyte circuit, this heat exchanger operating by natural convection.

Figure 2:
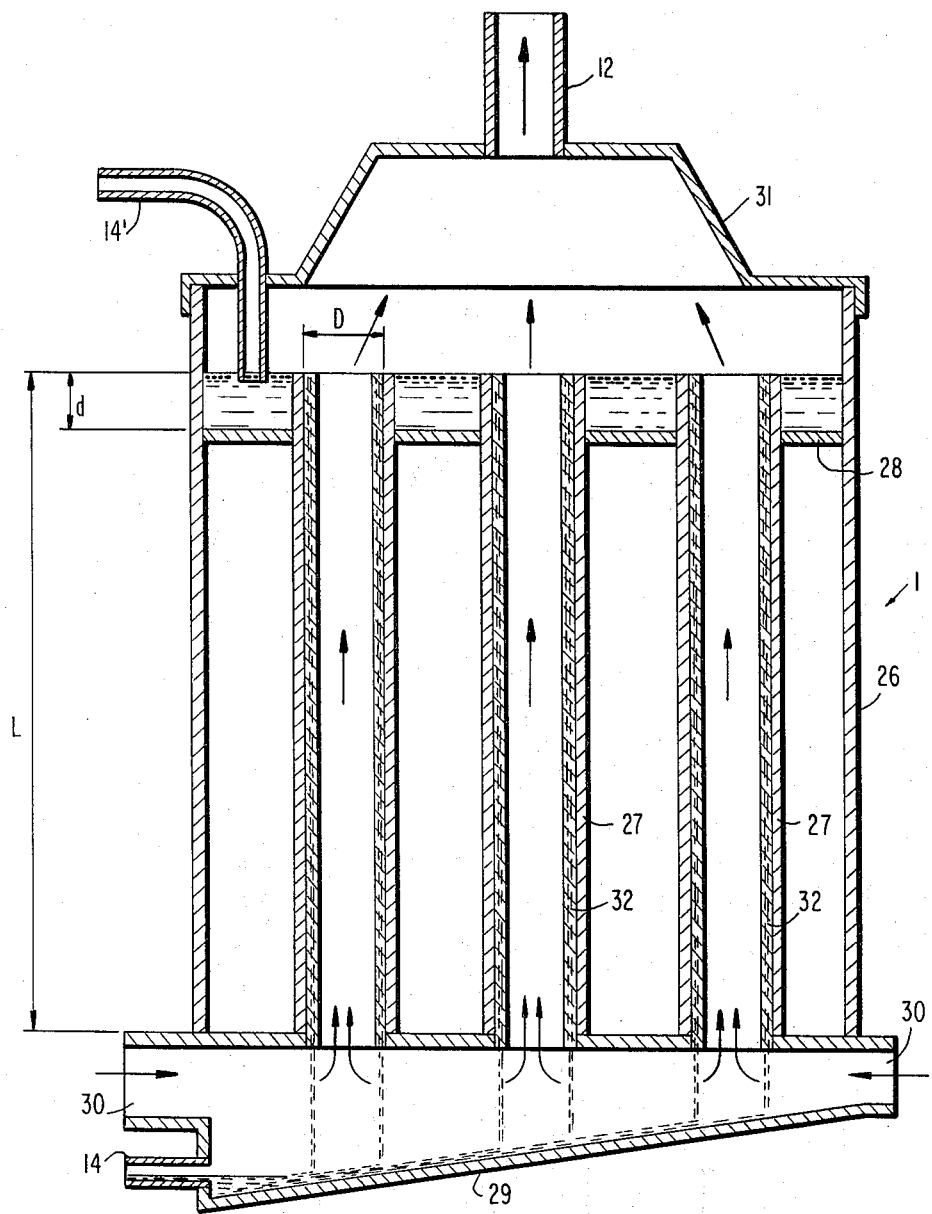

Other characteristics and advantages of the present invention will become apparent from the embodiment thereof shown in the accompanying drawings, wherein;

FIG. 1 illustrates schematically the general structure of the fuel cell of the present invention, and FIG. 2 illustrates a particular embodiment of the purifier.

The fuel cell according to the present invention (FIG. 1) comprises in a vertical upward direction a comburent purifier 1, which will be further described hereinafter, and a cell block 2.

If the comburent used is ambient air, it must be purified by the removal of carbon dioxide ($CO_2$). This is achieved by chemical absorption, in other words, by the natural diffusion of the carbon dioxide gas ($CO_2$) in an appropriate purifying liquid.

In order to have an optimal efficiency, the purifying liquid must be stirred in the purifier so as to continuously renew the liquid film in contact with the air. For this purpose, one may use a "gas lifter" known per se and discussed in "Gas Lift Theory and Practice Including a Review of Petroleum Engineering Fundamentals" bg K. E. Brown of New Jersey, Prentice Hall Inc. 1967, page 924, and the article "Thermodynamics of the Oil Production by Gas Lift" by Wayne C. Edmister and Richard J. Maggary in *Oil Weekly*, June 1947, pages 61–62. Gas lifter 4 is operated by the injection of the gaseous fuel in the liquid column whereby a small fraction of the expansion energy of the fuel (hydrogen), for example, causes the stirring of the purifying liquid. As a matter of fact, the inlet duct 21 of the fuel may be disposed in a manner such as to cooperate with the duct 14 of the purifying liquid in the apparatus 4 so as to lift up the latter to the upper part 14' of the purifier 1.

In the return circuit of the purifying and absorption liquid one may further dispose between the apparatus 4 and the return inlet 14' an apparatus 1' for regenerating the absorptive ability of the absorption liquid whenever a regenerable liquid is used.

The comburent consisting of purified air is introduced by way of the rectilinear duct 12 being disposed vertically and connecting the lower part of the cell block 2 and the upper part of the purifier 1 which is disposed vertically below the cell block 2. The fuel, generally hydrogen having a sufficient degree of purity, passes through the duct 21 into the upper part of the block 2. The hydrogen of convenient purity may be supplied to the duct 21 from any convenient source, for example, a pressurized hydrogen cylinder, not shown in the figure. The basic electrolyte (KOH, for example) which is contained in the fuel cell circulates, so as to be conveniently stirred through the outlet duct 22 disposed in the upper part of the block 2, and the ducts 23 and 24, and thereafter returns toward the lower part of the block 2 by way of the duct 25.

In order to assure the thermal equilibrium of the fuel cell as a whole, it suffices to act upon the electrolyte and to assure the correct cooling thereof. This object is obtained by providing for the circulation of the electrolyte by way of a heat exchanger. Whenever the ambient temperatures do not vary very much with respect to an average value, the circulation of the electrolyte is insured by means of a simple thermosiphon effect between the block 2, which is the hot source, and a cold source consisting of an exchanger 3 that operates by natural convection by means of small blades, wings or fins 31, for example.

In order that it be possible to maintain the block 2 at a constant operating temperature, regardless of the ambient temperature, a thermoregulator 3' may be disposed in the circuit, and preferably at the point of the junction between the duct 23 originating from the block 2, the duct 24 originating from the exchanger 3 and the return duct 25. This regulator may consist, for example, of an ordinary check valve whose opening is only a function of the temperature of the electrolyte issuing from the heat exchanger 3. For purposes of regulating the rate of flow of the electrolyte from one of the ducts 23 or 24, it suffices that this check valve be either totally or partially closed (by means of gravity, or the action of a spring, or by any other appropriate fixed means adapted to operate without any control other than that of a thermostat, for example). Such thermo regulators are known to the art and discussed in "Les Vannes Thermostatiques" [Thermostatic Valve Gates], *Revue Petroliere*, November 1963, pages 57 to 59.

It is advantageous to reduce the cross-sections of the chambers in block 2 provided for the circulation of the gaseous fuel (hydrogen) to values which do not introduce, or result in, significant losses in pressure. In order to avoid any unbalances in the supply of the various chambers and also to insure therein identical rates of flow, it is preferable to cause the hydrogen to pass through capillary tubes disposed above each chamber in a distributor 2', for example. The dimensions of the capillary tubes are chosen so as to insure the easy passage of the fuel, without being liable to any obstruction by a drop of liquid. The use of the distributor is particularly convenient when the hydrogen electrodes are very thin and can not withstand high pressures.

The operation of the fuel cell of the present invention is as follows: The comburent which, in the case envisaged here, is the ambient air, is sucked into the purifier 1 in the direction of the arrows $f_1$ by virtue of the vertical arrangement of the essential elements consisituting the fuel cell, i.e., the purifier 1 which constitutes the cold part and is disposed below the block 2, which constitutes the hot part of the fuel cell. There is thus established as a result of this disposition a "draft stack" operation; in other words, an operation by natural convection, and the upward movement of the air may be further improved by disposing at the outlet of the block 2 a duct 13 for the air and combustion products, which duct may be provided at its upper end and with a suction device of the Venturi type known per se, being actuated by the movements of the ambient air.

The purified air is heated during the electrochemical reactions taking place in block 2. Since this block 2 is of a type known per se, it has not been described herein in further detail. For example, French Pat. No. 1,583,806, which corresponds to U.S. Pat. No. 3,476,609 incorporated herein by reference, discloses such a block. In fact, it suffices that, in a block of this type which has a generally known construction or provision, the passage cross sections of the different fluids, namely fuel (hyrogen), air comburent (purified air), and electrolyte (a basic product, for instance KOH), be determined in such a manner that the pressure losses be minimal. An effective stirring of the electrolyte is obtained by causing it to be circulated between the upper outlet of the block 2 by way of the ducts 22, 23, and 24 along the direction of the arrows $f'_2$ through a heat exchanger 3, and a lower inlet 25 of block 2 by the thermosiphon effect. A regulator 3' for the respective rates of flow of the cooled electrolyte and of the uncooled electrolyte may be mounted between the inlet ducts 23 and 23 and the return duct 25 so as to assure the operation of the block 2 at a substantially constant temperature.

This regulator is preferably a static regulator in the form of a thermo-regulator for example, which does not require for its operation any energy spply from the fuel cell.

Before entering into the block 2, the air passes through a purified 1 where carbon dioxide is removed by simple chemical absorption; in other words, by the natural diffusion of the carbon dioxide in an appropriate liquid. Generally, it will be advantageous to employ a regenerable liquid, e.g. mono or diethanolamine, preferably at a low temperature. Such a regenerating apparatus 1' is preferably mounted on the inlet duct 14' of the purifier of the purifiying liquid circulation circuit. The thermal source of a decarbonator-regenerator may be a heating resistor connected to the terminals of the battery, for example, or else a flame burner, or a catalytic burner supplied or fed by a small fraction or portion of the fuel (hydrogen).

The circulation in the direction of the arrows $f'_1$ of the liquid of the air purifier is carried out, or proceeds, via the ducts 14 which cooperate at 4 with the inlet ducts 21 for the fuel in the direction of the arrows $f_2$ in such a manner that a small fraction or portion of the expansion energy or power of the hydrogen be sufficient to cause the purifying liquid to be lifted up to the regenerator 1' and through the return path 14' to the purifier 1.

As has already been indicated hereinabove, the fuel passes preferably through a distributor 2' which consists of capillary tubes disposed above each chamber.

In order for the fuel cell according to the present invention to function properly, it is necessary that the comburent purifier 1 assure for the air a passage with a minimal pressure loss, while still having a good absorption yield. Furthermore, the comburent purifier must, for obvious reasons, have dimensions being as small as possible.

A preferred embodiment of the comburent purifier 1 provided in the fuel cell as proposed by the present invention is schematically illustrated in FIG. 2 in a vertical cross-sectional view thereof.

This comburent purifier comprises a housing 26 in which there are disposed tubes 27 being held vertically by at least one supporting plate 28 provided integral with the housing 26 and positioned at a certain distance "$d$" below the upper end of the tubes 27. The plate 28 constitutes with the housing 26 and in the upper part of the latter a resevoir whose usefulness will become apparent hereinafter.

The upper ends of the tubes 27 are positioned at the same level in the upper part of the housing 26. For the sake of greater clarity of illustration, only three tubes 27 have been represented therein, but this number is in no way limitative. Each tube 27 has an inside diameter D and a length L.

The housing is closed at the lower part thereof by means of a plate 29 which is slightly inclined with respect to the horizontal, and which constitutes a container for recovering the purifying liquid. The duct 14 is secured to the plate 29. Orifices 30 having large dimensions are disposed at the lower part of the housing 26 for purposes of the introduction of air into the comburent purifier 1.

At the upper part thereof, the hhousing 26 is closed by means of a cover 31 to which are secured the vertical duct 12 connecting the purifier 1 to the fuel cell block 2, and the duct 14' allowing for the introduction of the purifying liquid into the comburent purifier 1.

The inner (or inside) surface of each tube is equipped or provided with a porous material 32, such as felt.

The operation of the purifier 1 is as follows:
The comburent purifying liquid is introduced into the purifier 1 through the duct 14' whose level is raised until it reaches the upper end of the tubes 27. From there, the liquid impregnates the porous material provided on the inner surfaces of the tubes 27 and flows regularly and with an essentially constant rate of flow downward through the tubes, being ultimately collected at the lower part of the purifier 1 where, by means of the duct 14, it may be recycled after regeneration. The amibient air is introduced into the purifier 1 through the orifices 30 and circulates vertically upwardly in the tubes 27 where it will contact the purifying liquid thereby absorbing the carbon dioxide ($CO_2$) contained in the ambient air. The purified air will then circulate toward the fuel cell block 2 by means of the duct 12.

It is understood that the efficacy of the purifier 1 depends substantially upon the dimension of the tubes 27.

Tests have been performed which show that, in order that the fuel cell proposed by the present invention be adapted to function properly, the pressure loss due to the circulation of air in the purifier must be smaller than 5 percent of the pressure $P_a$ of the air at the inlet of the purifier, and preferably at most equal to 2 percent of the pressure $P_a$. Furthermore, the efficacy of the purifier must be such that, at the outlet, the content of carbon dioxide ($CO_2$) in the purified air be lower than 40 ppm.

It has been found that these conditions are obtained by using N tubes 27 whose inside diameter D is at least equal to 0.01 m and preferably at least equal to 0.02m, and which have a length such that $$L \leq 5 \; 10^4 N \, D^4$$

and $$\pi D L N \geq 10^3 Q$$

N being the number of tubes 27; D the inside diameter of these tubes expressed in meters; L the length in meters of the tubes 27, and Q measured in $m^3/s$ the rate of flow of decarbonated air supplied by the purifier 1.

By way of example, a fuel cell according to the present invention supplying an electric power of 70 watts has been equipped with a comburent purifier comprising 40 tubes having an inside diameter of 0.02m and a length of 0.3m. The purifying liquid may consist of a potash (KOH) solution having a total volume of 40 liters and a total rate of flow of 0.222 $10^{-8} m^3/s$. This purifier furnishes 2 $m^3/h$ of purified air whose carbon dioxide ($CO_2$) content was 30 ppm, the content of carbon dioxide in the air at the inlet of the purifier being 400 ppm. This purifier allows for an operation of the fuel cell for 5,000 hours without regeneration of the purifying liquid, but with stirring of this liquid by the exterior circuit which causes the ducts 14 and 14' to communicate (FIG. 2).

While there have been given herein certain specific examples of the practice of this invention, it is not intended to have this invention limited to or circumscribed by the specific conditions herein specified in view of the fact that the invention may be modified according to individual preference or conditions without necessarily departing from the spirit of this disclosure and the scope of the appended claims.

The fuel cell according to the invention has the advantage of a great simplicity and sturdiness and may be used inside and out over long periods which may reach one year or more without requiring a costly maintenance of the cell and its fittings.

What I claim is:

1. A fuel cell comprising a cell block forming the hot part of the fuel cell, said cell block having inlet and outlet means for the purpose of introducing into said fuel cell block and evacuating therefrom at least one comburent, one fuel, and an electrolyte, duct means connected to said inlet means for supplying respectively said cell block with comburent, fuel and electrolyte, a comburent purifier constituting the cold part of said fuel cell, said cell block being placed above and substantially straight above said comburent purifier, said comburent purifier comprising a housing in which there are placed a plurality of vertical tubes having predetermined inside diameters and lengths, and whose inside surfaces are covered with a porous material, the upper ends of these tubes being located at the same level in said housing which forms around said tubes a reservoir for containing a liquid for purifying the comburent, said housing being provided at the lower part thereof, with means for introducing the comburent exclusively into said tubes and, at the upper part thereof, with means for evacuating the purified comburent and putting in communication the upper ends of said tubes with said duct means for supplying said fuel cell block with comburent, said duct means being substantially rectilinear and placed vertically so as to directly connect the means for evacuating said comburent purifier and the means for introducing said comburent into said cell block, said housing comprising at the upper part thereof means for introducing a comburent-purifying liquid whose level is maintained even with the upper ends of said tubes and comprising, at the lower part thereof, means for evacuating the used purifying liquid after passage through said tubes.

2. A fuel cell according to claim 1, wherein the comburent is ambient air, and the purifier comprises N tubes, each having an inside diameter D being at least equal to 0.01m, and a length L which satisfies the ratios $$L \leq 5 \; 10^4 N \, D^4$$

and $$\pi D L N \geq 10^3 \, Q,$$

L and D being expressed in meters, and Q being the rate of flow of the purified comburent delivered by said purifier, said rate of flow being measured in $m^3/s$.

3. A fuel cell according to claim 1, wherein said vertical duct means connecting said purifier and said block is a suction duct means comprising at the upper end thereof a static suction device of the Venturi type.

4. A fuel cell according to claim 2, comprising an external circuit for stirring the purifying liquid absorbing the carbon dioxide contained in the air traversing the comburent purifier, said stirring circuit connecting the means for evacuating and introducing the purifying liqiuid which are arranged in the lower and upper parts of said housing, said stirring circuit comprising a device of the gas lift type so as to have the purifying liquid circulate from the evacuation means toward the introduction means of said purifying liquid, said gas-lift-type device acting upon said liquid with a small portion of the expansion energy of the fuel supplying the fuel cell.

5. A fuel cell according to claim 4, in which said external stirring circuit comprises means for regenerating said purifying liquid.

6. A fuel cell according to claim 5, comprising a fuel distributor connected to the duct for supplying said cell block with fuel.

7. A fuel cell according to claim 6, wherein said distributor comprises capillary tubes disposed above the chambers of said cell block.

8. A fuel cell according to claim 6, wherein said cell block comprises very fine fuel electrodes which are adapted to withstand only small pressures.

9. A fuel cell according to claim 1, comprising a circuit for stirring the electrolyte in which the electrolyte is cooled in a heat exchanger which is part of said stirring circuit.

10. A fuel cell according to claim 9, wherein said heat exchanger is disposed at the outside of said cell block and is of the type that operates by natural convection.

11. A fuel cell according to claim 10, further comprising in said circuit for stirring the electrolyte a static heat exchange regulator connected to the cell block via a first duct means within which circulates the uncooled electrolyte coming directly from the cell block and a second duct means through which circulates the electrolyte cooled in the heat exchanger, said regulator being connected to said cell block by means of a third duct through which circulates the electrolyte which is supplied by the regulator in order to be re-introduced into said cell block.

* * * * *